United States Patent
Niemelä et al.

(10) Patent No.: US 10,148,643 B2
(45) Date of Patent: Dec. 4, 2018

(54) AUTHENTICATING OR CONTROLLING SOFTWARE APPLICATION ON END USER DEVICE

(71) Applicant: F-Secure Corporation, Helsinki (FI)

(72) Inventors: Jarno Niemelä, Kirkkonummi (FI); Mikko Hyykoski, Helsinki (FI)

(73) Assignee: F-Secure Corporation, Helsinki (FI)

( * ) Notice: Subject to any disclaimer, the term of this patent is extended or adjusted under 35 U.S.C. 154(b) by 126 days.

(21) Appl. No.: 15/447,265

(22) Filed: Mar. 2, 2017

(65) Prior Publication Data

US 2017/0257361 A1 Sep. 7, 2017

(30) Foreign Application Priority Data

Mar. 3, 2016 (GB) .................................. 1603677.4

(51) Int. Cl.
| | |
|---|---|
| *H04L 29/06* | (2006.01) |
| *G06F 21/62* | (2013.01) |
| *H04L 9/32* | (2006.01) |
| *G06F 21/51* | (2013.01) |

(52) U.S. Cl.
CPC .......... *H04L 63/0823* (2013.01); *G06F 21/51* (2013.01); *G06F 21/6218* (2013.01); *H04L 9/3247* (2013.01); *H04L 63/0853* (2013.01); *H04L 63/123* (2013.01)

(58) Field of Classification Search
CPC ............... H04L 63/0823; H04L 63/123; H04L 63/0853; H04L 9/3263; G06F 21/57; G06F 21/6218

USPC ......................................................... 713/156
See application file for complete search history.

(56) References Cited

U.S. PATENT DOCUMENTS

| | | | | |
|---|---|---|---|---|
| 6,915,433 | B1* | 7/2005 | Barber | G06F 21/64 |
| | | | | 713/161 |
| 8,621,591 | B2* | 12/2013 | Sobel | G06F 21/645 |
| | | | | 713/156 |
| 9,246,923 | B1* | 1/2016 | Terribilini | H04L 63/101 |
| 9,338,012 | B1 | 5/2016 | Naik et al. | |
| 2002/0078380 | A1* | 6/2002 | Lin | G06F 21/10 |
| | | | | 726/28 |
| 2002/0138744 | A1* | 9/2002 | Schleicher | H04L 63/0823 |
| | | | | 713/187 |
| 2003/0097558 | A1* | 5/2003 | England | G06F 21/57 |
| | | | | 713/155 |

(Continued)

*Primary Examiner* — Syed A Zaidi
(74) *Attorney, Agent, or Firm* — Harrington & Smith

(57) ABSTRACT

A method of authenticating or controlling a software application on an end user device. The method includes selecting a code signing certificate related to an application developer; selecting one or more clean files from a database of known clean files signed with the selected code signing certificate; generating an application developer identification for the application developer on the basis of data extracted from the selected one or more clean files; adding the generated application developer identification to a database of trusted application developer certificates; comparing a signature related to a software application to be installed on an end user device with the application developer identification for authenticating said signature; and in the event that authentication is successful, performing authentication of the software application code and/or controlling installation and/or operation of the software application.

14 Claims, 4 Drawing Sheets

(56) References Cited

U.S. PATENT DOCUMENTS

| | | | | |
|---|---|---|---|---|
| 2003/0097579 | A1* | 5/2003 | England | G06F 21/53 |
| | | | | 713/193 |
| 2004/0015960 | A1* | 1/2004 | Wanchoo | G06F 9/445 |
| | | | | 717/178 |
| 2005/0021404 | A1* | 1/2005 | Schoder | G06Q 30/02 |
| | | | | 705/14.66 |
| 2009/0210702 | A1* | 8/2009 | Welingkar | H04L 9/321 |
| | | | | 713/156 |
| 2010/0005291 | A1* | 1/2010 | Hulten | G06F 21/51 |
| | | | | 713/156 |
| 2011/0218920 | A1* | 9/2011 | Agrawal | G06Q 30/0283 |
| | | | | 705/50 |
| 2012/0179907 | A1* | 7/2012 | Byrd | H04L 9/3268 |
| | | | | 713/156 |
| 2012/0331020 | A1* | 12/2012 | Morishita | G06F 17/30265 |
| | | | | 707/822 |

* cited by examiner

AUTHENTICATING OR CONTROLLING SOFTWARE APPLICATION ON END USER DEVICE

TECHNICAL FIELD

The present invention relates to authenticating or controlling a software application on an end user device.

BACKGROUND

The recent massive growth in the availability and use of software applications, commonly referred to as "apps", particularly for smartphones, tablets, and other portable, wireless devices, has provided an opportunity for criminals and others with malicious intent. Apparently trustworthy apps may be used to install malware onto user devices. In order to protect against such threats, operating system vendors such as Google™®, Apple™® and Microsoft® generally implement a certificate based authentication mechanism in their operating systems. In order for its apps to work with a given operating system, an app developer must first obtain a code signing certificate form the operating system vendor. Such a certificate may be, for example, a private key of a public-private key pair according to the RSA public key cipher algorithm.

According to one such approach, the code forming the app, or possibly an abbreviated hash of that code, is encrypted by the app developer using its private key to generate a signature. The signature may also be taken over identity data such as the developer's name. The plain text code, signature, and optionally the developer's public key and claimed identity, are then distributed to end user devices. The operating system on the device typically comprises an app installer which uses the signature to authenticate the code. If the developer's public key is not provided by the developer, the app installer first obtains the developer's public key from the operating system vendor (or its agent) using the developer's claimed identity. If the public key is provided by the developer, the authenticity of the public key may be confirmed by performing a check with the operating system vendor. The app installer generates a hash of the code if required. It decrypts the received signature using the developer's public key, and compares the result with the code or hash. If the two match, then the app installer assumes that the app is validly provided by the approved developer and continues with the installation process. If not, then installation is stopped and, if required, an alert generated.

Additional authentication mechanisms may be employed to increase security. For example, Apple™® apply a further signature to apps available on their app store. Apple only apply this signature after they have themselves verified the identity of the app developer and confirmed the proper operation of the app. However, such an approach is not appropriate for all operating system vendors, particularly where a more flexible app distribution approach is desirable.

A further use of certificates is to minimise the load on client device antivirus (AV) scanners. Scanning a particular app using signature and heuristic scanning engines to detect malware can be relatively computationally intensive. An AV scanner may therefore maintain a database of trusted sources and their respective public keys (or links to those keys). When an app to be scanned is identified as being accompanied by a certificate, before commencing an intensive scan, the AV engine will first check if the certificate is associated with a trusted source. If so, then a detailed scan may not be considered necessary. Of course, the use of certificates to minimise AV scanning requirements may be applicable not just to apps, but to files in general. Such a "whitelisting" approach to AV scanning is extremely useful in order to reduce computational load and improve device performance.

Important uses of certificates is for cyber security end point protection, automated forensic and cyber defence products. Modern cyber defence relies very much on application developer identification, which means that anyone who can steal a certificate will be able to bypass a lot more than an antivirus scanner. For example, nuclear power plants and other critical systems very often identify every binary by using some form of a whitelist and code signing certificates are one of the most important whitelists used nowadays. This means that an efficient detecting of malware in any critical systems is very dependent on authenticity of the code signing certificates.

In the absence of an additional security mechanism such as that employed by Apple™®, the conventional approaches (to both AV scanning and app installation) are only secure if app developers prevent their code signing certificates from falling into the hands of attackers. Furthermore, the conventional approaches cannot by itself protect against rogue developers who validly obtain a code signing certificate.

Further, in order to gain speed security vendors are required to trust thousands of code signing certificates. This means that it is trivial for an attacker to compromise one developer among thousands and steal the certificate. One solution to this problem is to send metadata about the signed files to upstream and then compare whether the metadata matches with the one of the developer. However, this solution does not scale to tens of millions of users because local certificate databases are supposed to prevent such queries.

SUMMARY

It is an object of the present invention to enhance the conventional code signing certificate based authentication mechanisms in order to reduce the risk of attack.

According to a first aspect of the present invention there is provided a method of authenticating or controlling a software application on an end user device. The method comprises: a) selecting a code signing certificate related to an application developer; b) selecting one or more clean files from a database of known clean files signed with the selected code signing certificate; c) generating an application developer identification for the application developer on the basis of data extracted from the selected one or more clean files; d) adding the generated application developer identification and the related code signing certificate to a database of trusted application developer certificates; e) comparing a signature related to a software application to be installed on an end user device with the respective application developer identification and the code signing certificate in the database for authenticating said signature; and f) in the event that authentication is successful, performing authentication of the software application code and/or controlling installation and/or operation of the software application.

In the event that authentication of said signature is unsuccessful, installation of the software application may be prevented. In the event that authentication is unsuccessful, a computer security service may perform a computer security scan of the application code using one or both of a signature based scan or a heuristic based scan and, in the event that authentication of the application code using said conditions is successful, no such computer security scan is performed.

In an embodiment, in the event that authentication of said signature is unsuccessful, an alert of a possible abuse of a code signing certificate is given.

In an embodiment, a computer security service may detect downloading of the software application data and perform steps a) to e) prior to installation of the application on the end user device and the computer security client may prevent installation of the application if authentication fails. In an embodiment, the computer security service detects downloading of the software application data and performs steps a) to e) prior to installation of the application on the end user device and the computer security service controls installation and/or operation of the application.

In an embodiment, a computer security service employs a computer security client installed on said end user device and the computer security client performing steps e) to f). In another embodiment, the steps a) to e) are performed by a remote server or server cloud. In an embodiment, the steps e) to f) are performed by an application installer associated with a local operating system of the end user device.

In an embodiment, the step e) may comprise determining whether the signature related to a software application matches with the application developer identification by a predetermined amount. In an embodiment, the step c) comprises using at least one or more of the following data for generating the application developer identification: a file content data; a compiler identification data; a library data; location of the file data; an installer data; portable executable (PE) version data or any other version data; an attribute of the file data. In an embodiment, the step c) comprises using machine learning, bloom filters, deep learning or other methods for selecting the specific extracted data of clean files that can be used to identify software applications being related to the same application developer.

According to a second aspect of the present invention there is provided a non-transitory computer storage medium having stored thereon computer program code for implementing the method of the above first aspect of the invention.

According to a third aspect of the invention there is provided apparatus for authenticating or controlling a software application on an end user device, the apparatus comprising processor circuitry and a storage unit for storing instructions executable by the processor circuitry. The apparatus is operative to: a) select a code signing certificate related to an application developer; b) select one or more clean files from a database of known clean files signed with the selected code signing certificate; c) generate an application developer identification for the application developer on the basis of data extracted from the selected one or more clean files; d) add the generated application developer identification to a database of trusted application developer certificates; e) compare a signature related to a software application to be installed on an end user device with the application developer identification for authenticating said signature; and f) in the event that authentication is successful, performing authentication of the software application code and/or controlling installation and/or operation of the software application.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

As discussed above, code signing certificate based authentication mechanisms are commonly used to allow end users, or rather their devices, to authenticate the source of a downloaded app or other file. In the following discussion it is assumed that this or a similar method forms the basis of the authentication process implemented by some local application or task, such as an app installer of an operating system (OS) or antivirus (AV) scanner or any computer security process. In addition, the local application or task applies one or more conditions when determining whether or not to trust a file or files being installed or run on the device.

Figure 1:
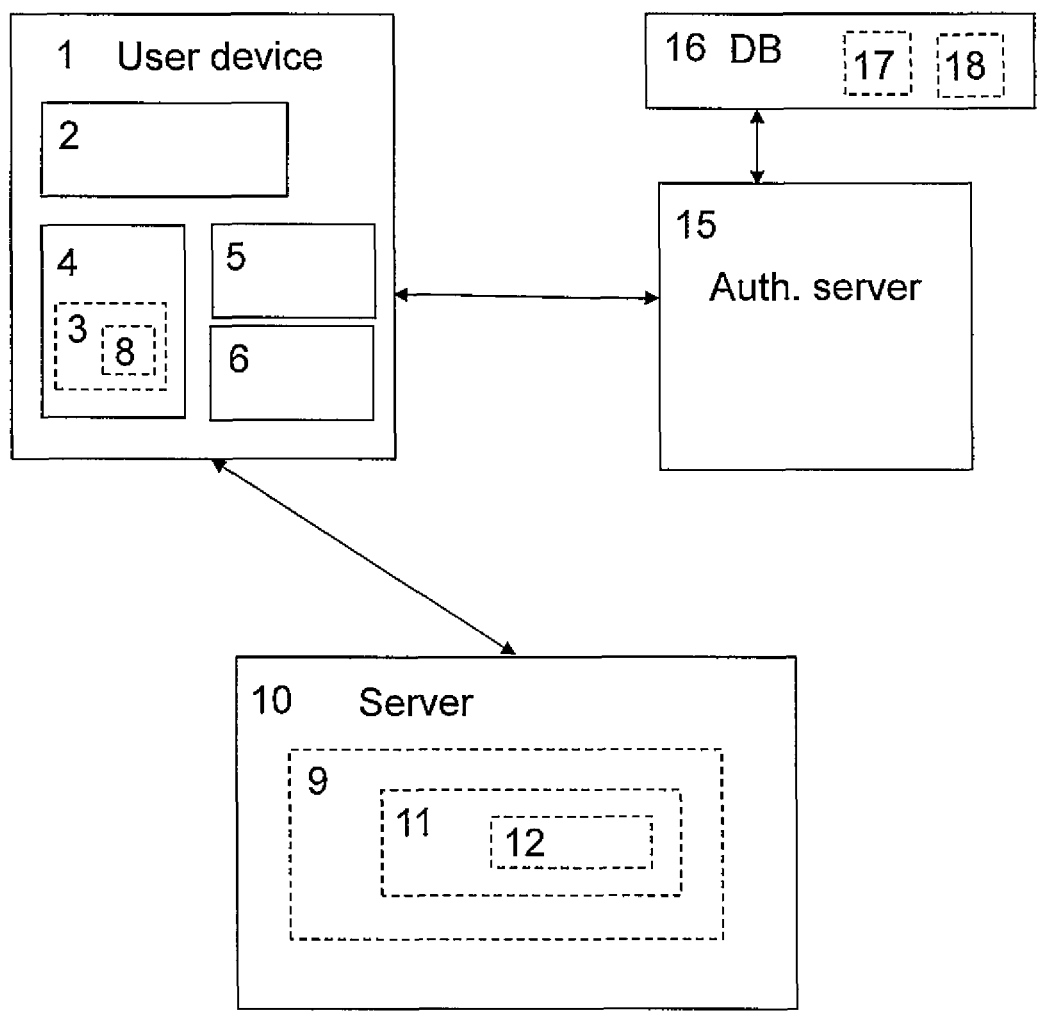
FIG. 1 illustrates schematically a system architecture for applying authentication of apps at an end user device.

FIG. 1 illustrates schematically a system architecture employing this approach in the context of an app installer. A smartphone, tablet or other end user device 1 comprises a graphical user interface (GUI) 2. Code 3 for implementing an operating system (OS) is installed in a device memory 4, and is run by a processor 5 and other memories 6. The OS may be, for example, Android®, iOS®, or Windows Mobile®. The OS code comprises code for implementing an app installer 8. Typically, the app installer 8 is initiated when a user selects, via the GUI 2, to download and install an app. The user typically does this by first accessing an app store 9. In the case of a device implementing Android®, one such app store is Google play®. The app store is hosted by a server or server cluster/cloud 10. An app developer publishes its app on the app store. One such app 11 is illustrated in FIG. 1.

The app 11 comprises app code 12. In the case of Android®, this code includes an "APK." file (Android Application Package). In addition, the app comprises a signature generated using, for example, a conventional code signing certificate based authentication mechanism. The signature may be obtained by applying a private key of the app developer to a hash of the APK file (and possibly additional data). The identity of the app developer is appended to the signature in plain text.

The act of selecting to download the app 11 causes the app installer 8 to be initiated. The installer downloads the app 11 from the app store and saves this temporarily in some device memory.

The OS vendor, or some trusted third party, maintains an authentication server 15, or server cluster/cloud, that has access to a database 16 of trusted application developer certificates that comprises code signing certificates 17 and respective application developer identifications 18 generated for one or more application developers. The application developer identifications are generated on the basis of data extracted from one or more selected clean files from a database of known clean files signed with the code signing certificate of the specific application developer. The code signing certificates are mapped in the database to respective developer identities. The app installer 8 on the end user device 1 is able to query the database 16, via the authentication server 15, using as lookup key the app developer identity 14 that is appended to the app signature 13. In response to such a query, the authentication server returns the public key to which the app developer's identity 14 is mapped (assuming that such a mapping exists in the database), together with the associated authentication results. This query and response procedure is secured by some appropriate mechanism agreed between the authentication server 15 and the end user device 1 (e.g. using an RSA public key cipher algorithm where the public key of the authentication server 15 is securely pre-installed in the end user device).

Upon receipt of the response, in the event that authentication is successful, the app installer 8 performs a first level authentication of the downloaded app code 11 using the public key. This may involve generating a hash of the APK file, applying the public key to decrypt the signature, and comparing the result to the locally derived hash. If the decrypted signature and the hash match, then this provides an initial indication that the app is authentic. However, as discussed above, this by itself does not protect against malware that has been signed with an authentic, but stolen code signing certificate, or malware that has been generated by a rogue developer that has previously obtained a valid code signing certificate. To add a further line of defence, the app installer 8 makes use of the authentication results provided in the response from the authentication server. These results set limits on the installation behaviour, operation, or possibly other features of the app. For example, in the event that the authentication is not successful, a further computer security scan or anti-virus scan of the software application may be performed.

The approach described above is equally applicable to AV scanning or cyber security processes that make use of code signing certificate based authentication mechanisms in order to identify whitelisted apps and files for which further security measures are unnecessary. A typical approach involves an AV vendor creating whitelists of trusted certificates and maintaining these on a database accessible via a back end authentication server. AV scanning clients are installed on end user devices. When a client determines a need to scan a file or files, e.g. belonging to an app downloaded onto the end user device, the client first identifies a signature included within the app code, and an identity of the app developer. The client queries the database via the back end authentication server in order to obtain the developer's public key and an associated authentication results based on comparing the signature of the app code with the respective app developer identification and the code signing certificate in the database 16 (assuming these are available; if these are not available, the app may by default be identified as untrusted and either "rejected" or scanned). The client uses the public key to authenticate the signature.

If authentication is successful, the AV client may perform authentication of the application code and/or controlling installation and/or operation of the software application. If the app fails the authentication, either the app is rejected as suspect, or a further, full AV scan is performed.

Figure 2:
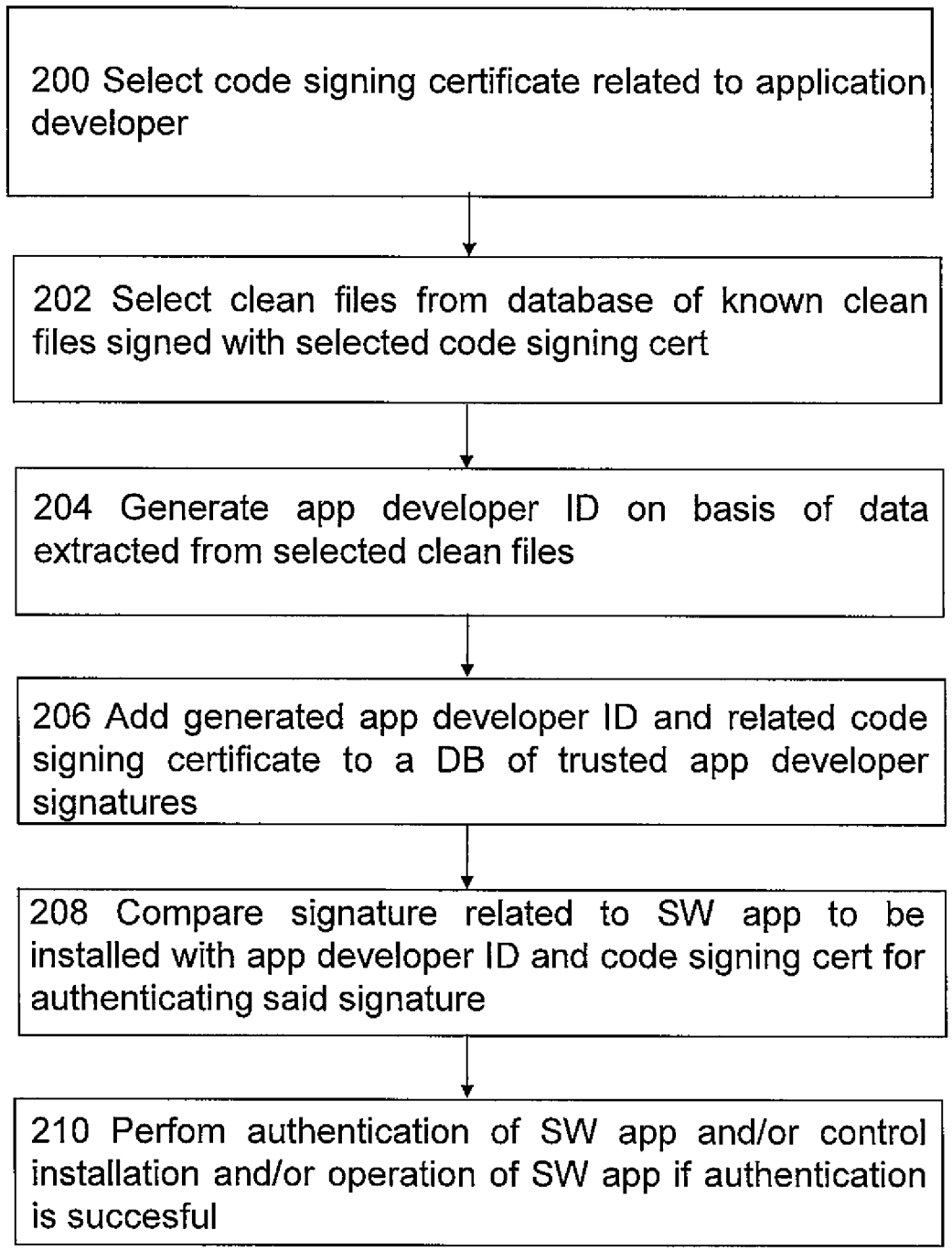
FIG. 2 is a flow diagram illustrating at a high level the procedure according to an embodiment.

FIG. 2 is a flow diagram illustrating an example of the operation of an apparatus in accordance with the approach described above. At step 200 a server apparatus selects a code signing certificate related to a specific application developer. This selection may be made based on reputation of the application developer or other data that can be used to deduce that this application developer can be trusted. At step 202 the server apparatus selects one or more clean files from a database of known clean files signed with the selected code signing certificate.

At step 204 the server apparatus generates an application developer identification for the application developer on the basis of data extracted from the selected one or more clean files. The application developer identification may be very generic and may contain information both from the clean file itself or environmental information from the system where the clean file is located. For example, compiler identification, a certain library that is being used by almost all of application developer files, a certain location, installed by particular installer of fields in PE version information or other similar fields. In an embodiment, the application developer identifications related to one or more application developers are built automatically using the files in the clean file database signed with the specific application developer code signing certificates respectively. In an embodiment, predetermined amount of prevalence is required for the files that are used in generating the application developer identifications in order to reduce the likeliness of the files comprising malware. In an embodiment the generation of the application developer identification may also comprise using machine learning, bloom filters, deep learning or other methods for selecting the specific extracted data of clean files that can be used to identify software applications being related to the same application developer.

In an embodiment, the generated application developer identifications need not be perfect in how accurately they can be used to detect files from the same developer but, for example, greater than 80 percent match to files from a specific application developer may be considered a very good result. In some embodiment, the generated application developer identification may also be enhanced by further methods if required.

At step 206 the generated application developer identification is added to a database of trusted application developer certificates 16. This database can be located at the server apparatus or at a separate database that is accessible via a communication network. The database of trusted application developer certificates can also be a local database that is transmitted to the end user devices and be updated regularly.

At step 208 a signature related to a software application to be installed on an end user device is compared with the application developer identification for authenticating said signature. The comparison can be carried out by the end user device or the server apparatus. In an embodiment, commencing downloading of a software application data from a remote server, e.g. a server hosting Google Play®, is used as a trigger for starting the comparison at the end user device or for transmitting the request for the authentication to the remote server. In an embodiment, instead of just trusting signatures blindly, only when both the application developer identification from the database and the code signing certificate of the software application match at least by a predetermined amount, can the authentication be performed. In the event that authentication is successful, authentication of the software application code and/or controlling installation and/or operation of the software application can be performed at step 210.

It will be appreciated that various modifications may be made to the above described embodiments without departing from the scope of the invention. For example, whilst the approach described above relies upon a remote lookup operation to provide the public key and authentication results associated with an app developer to the end user device, this data may be stored locally in the device as a local certificate trust database (which is periodically updated via downloads from a back end server). In a further alternative approach, the public key may be downloaded with the app, and verified with a remote or local lookup operation.

In a further alternative embodiment, various tasks described above as being performed by the end user device may be delegated to a remote server or server cloud. For example, relevant app data may be passed from the end user device to a server, with the server performing authentication of the signature and possibly authenticating based upon the comparison, before notifying the end user device whether or not installation can continue (and under what conditions).

Figure 3:
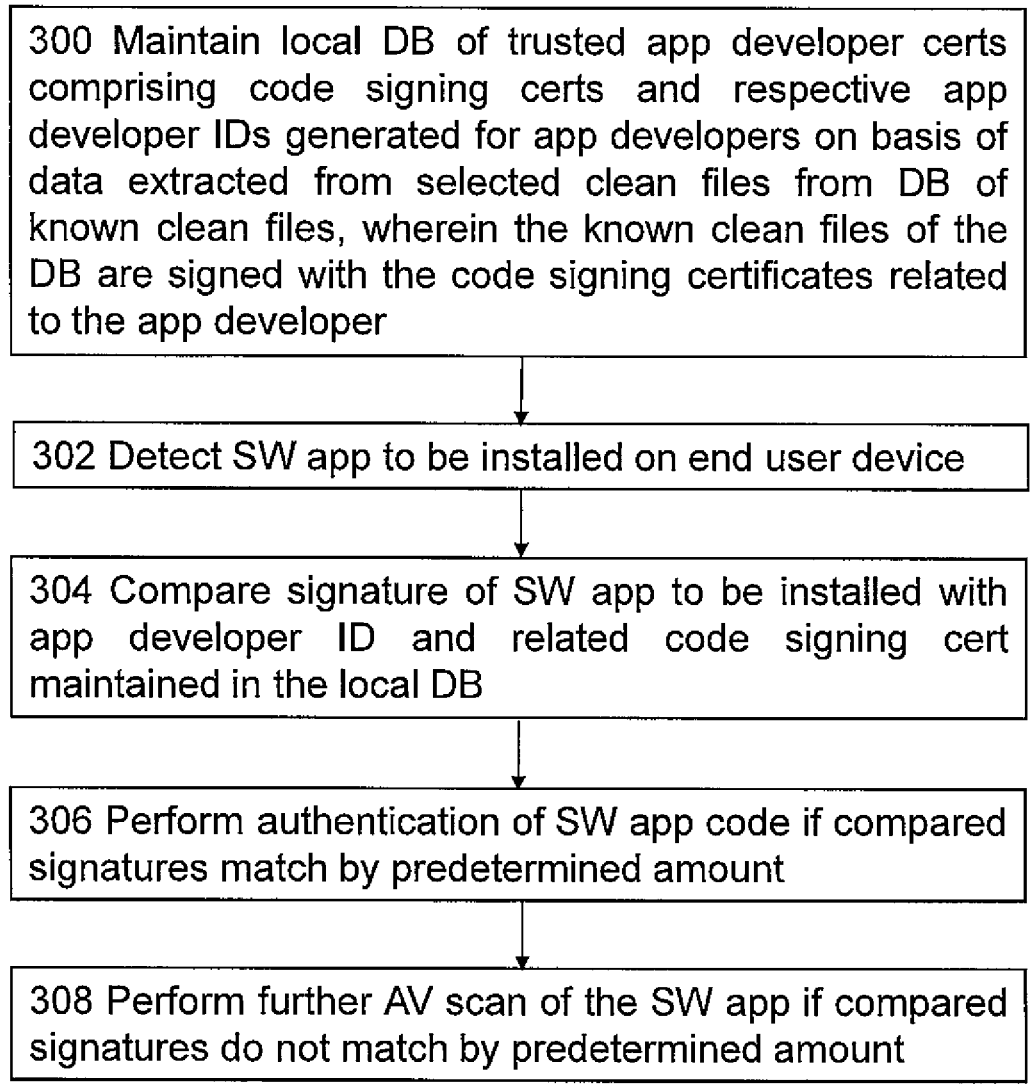
FIG. 3 is a flow diagram illustrating another example of the procedure according to an embodiment.

FIG. 3 is a flow diagram illustrating another example of the procedure according to an embodiment. At step 300, a user device maintains a local database of trusted application developer certificates comprising code signing certificates and respective application developer identifications. This local database is periodically updated via downloads from a back end server.

At step 302, the device detects a software application being installed on the device. Before the installation is allowed to continue, the device performs comparison of the signature received with the app to be installed with the app developer ID and the related code signing certificate maintained in the local database at step 304.

At step 306, if the compared data matches by at least a predetermined amount, the device performs authentication of the software application code. At 308, if the compared data does not match by at least a predetermined amount, then a further AV scan of the software application may be performed.

Figure 4:
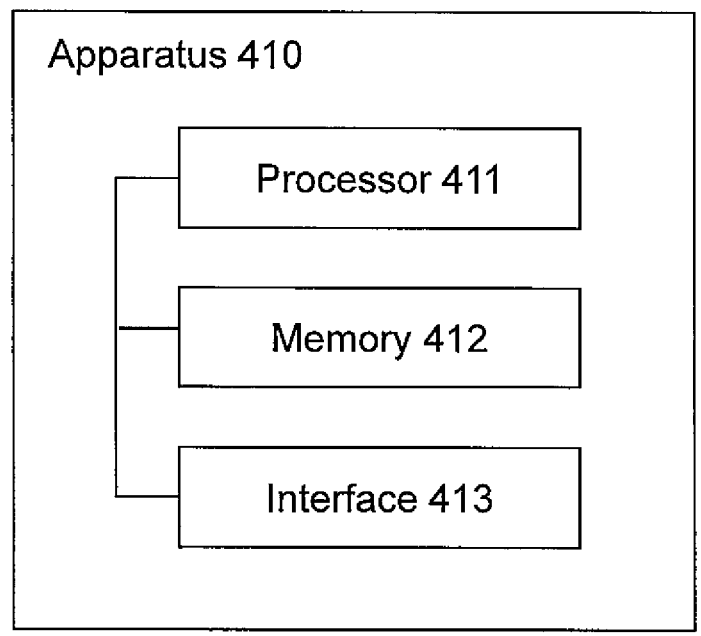
FIG. 4 shows a block diagram illustrating a structure of an apparatus according to an embodiment of the invention.

FIG. 4 illustrates a block diagram of an embodiment of an apparatus for carrying out the embodiments described above. The apparatus 410 may be comprised in the client or host computer or in a server computer of the computer network. The apparatus 410 may comprise a processing system configured or arranged to carry out computer security functions. The apparatus 410 may, for example, represent a (part of a) first node, such as user device 1 in FIG. 1, or may represent a (part of a) second node, such as server 10, 15 in FIG. 1. The apparatus 410 may be configured to perform a procedure and/or exhibit a functionality as described in any one of FIGS. 2 to 3.

The processing system may comprise at least one processor 411 and at least one memory 412 including a computer program code, wherein the at least one memory 412 and the computer program code are configured, with the at least one processor 411, to cause the apparatus to carry out the above-described embodiments of the invention. The apparatus may possibly also comprise at least one interface 413.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/or a field-programmable grid array (FPGA) circuit for the apparatus according to an embodiment of the invention.

The processes or methods described in FIGS. 2 to 3 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

For further details regarding the operability/functionality of the individual elements according to exemplifying embodiments of the present invention, reference is made to the above description in connection with any one of FIGS. 1 to 4, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java®, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

The present invention is applicable to apparatuses defined above but also to other suitable systems or computer networks. The specifications of the systems develop rapidly and such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method of authenticating or controlling a software application on an end user device, the method comprising:
   a) selecting a code signing certificate related to an application developer;
   b) selecting one or more clean files from a database of known clean files signed with the selected code signing certificate;
   c) generating an application developer identification for the application developer on the basis of data extracted from the selected one or more clean files;
   d) adding the generated application developer identification and the related code signing certificate to a database of trusted application developer certificates;
   e) comparing a signature related to a software application to be installed on an end user device with the respective application developer identification and the code signing certificate in the database for authenticating said signature; and
   f) in the event that authentication is successful, performing authentication of the software application code and/or controlling installation and/or operation of the software application.

2. The method according to claim 1, wherein, in the event that authentication of said signature is unsuccessful, installation of the software application is prevented.

3. The method according to claim 1, wherein, in the event that authentication is unsuccessful, a computer security service performs a computer security scan of the application code using one or both of a signature based scan or a heuristic based scan and, in the event that authentication of the application code using said conditions is successful, no such computer security scan is performed.

4. The method according to claim 1, wherein, in the event that authentication of said signature is unsuccessful, an alert of a possible abuse of a code signing certificate is given.

5. The method according to claim 3, wherein the computer security service detects downloading of the software application data and performs steps a) to e) prior to installation of the application on the end user device, the computer security client preventing installation of the application if authentication fails.

6. The method according to claim 3, wherein the computer security service detects downloading of the software application data and performs steps a) to e) prior to installation of the application on the end user device, the computer security service controlling installation and/or operation of the application.

7. The method according to claim 3, wherein said computer security service employs a computer security client installed on said end user device, the computer security client performing steps e) to f).

8. The method according to claim 3, wherein steps a) to e) are performed by a remote server or server cloud.

9. The method according to claim 1, steps e) to f) being performed by an application installer associated with a local operating system of the end user device.

10. The method according to claim 1, wherein step e) comprises determining whether the signature related to a software application matches with the application developer identification by a predetermined amount.

11. The method according to claim 1, wherein step c) comprises using at least one or more of the following data for generating the application developer identification:
   a file content data;
   a compiler identification data;
   a library data;
   location of the file data;
   an installer data;
   portable executable (PE) version data or any other version data;
   an attribute of the file data.

12. The method according to claim 1, wherein step c) comprises using machine learning, bloom filters, deep learning or other methods for selecting the specific extracted data of clean files that can be used to identify software applications being related to the same application developer.

13. A non-transitory computer storage medium having stored thereon computer program code for implementing the method of claim 1.

14. Apparatus for authenticating or controlling a software application on an end user device, the apparatus comprising processor circuitry and a storage unit for storing instructions executable by the processor circuitry, whereby the apparatus is operative to:

a) select a code signing certificate related to an application developer;
b) select one or more clean files from a database of known clean files signed with the selected code signing certificate;
c) generate an application developer identification for the application developer on the basis of data extracted from the selected one or more clean files;
d) add the generated application developer identification and the related code signing certificate to a database of trusted application developer certificates;
e) compare a signature related to a software application to be installed on an end user device with the respective application developer identification and the code signing certificate for authenticating said signature; and
f) in the event that authentication is successful, performing authentication of the software application code and/or controlling installation and/or operation of the software application.

* * * * *